United States Patent
Davis

(10) Patent No.: US 10,687,512 B1
(45) Date of Patent: Jun. 23, 2020

(54) TIMED GAME FEEDER

(71) Applicant: Joseph D. Davis, Washington, PA (US)

(72) Inventor: Joseph D. Davis, Washington, PA (US)

( * ) Notice: Subject to any disclaimer, the term of this patent is extended or adjusted under 35 U.S.C. 154(b) by 618 days.

(21) Appl. No.: 15/149,420

(22) Filed: May 9, 2016

Related U.S. Application Data

(60) Provisional application No. 62/158,644, filed on May 8, 2015.

(51) Int. Cl.
| | | |
|---|---|---|
| *A01K 1/10* | (2006.01) | |
| *A01K 5/02* | (2006.01) | |
| *A01M 31/00* | (2006.01) | |
| *H02S 30/10* | (2014.01) | |
| *H02S 40/38* | (2014.01) | |

(52) U.S. Cl.
CPC .......... *A01K 5/0275* (2013.01); *A01K 5/0266* (2013.01); *A01K 5/0291* (2013.01); *A01M 31/00* (2013.01); *H02S 30/10* (2014.12); *H02S 40/38* (2014.12)

(58) Field of Classification Search
CPC ...... A01K 5/0114; A01K 5/02; A01K 5/0275; A01K 5/0291; A01K 5/0266; A01M 31/00; A01M 31/008
See application file for complete search history.

(56) References Cited

U.S. PATENT DOCUMENTS

| | | | | |
|---|---|---|---|---|
| 2,500,243 A | * | 3/1950 | Dixon .................. | A01K 5/0291 119/51.13 |
| 2,969,769 A | * | 1/1961 | Paschall ............... | A01K 5/0275 119/53 |
| 3,029,978 A | * | 4/1962 | Gummere ............... | B25B 23/02 221/113 |
| 3,340,851 A | * | 9/1967 | Hugo ................... | A01K 5/0291 119/51.13 |
| 3,503,372 A | | 3/1970 | Saurer | |
| 3,658,036 A | * | 4/1972 | Caracappa ........... | A01K 5/0291 119/51.13 |
| 3,741,162 A | * | 6/1973 | Lopez ................. | A01K 5/0291 119/51.13 |
| 4,044,722 A | * | 8/1977 | Bradshaw ............ | A01K 5/0291 119/51.13 |
| 4,421,059 A | * | 12/1983 | Cousino ............... | A01K 5/0291 119/51.12 |
| 4,437,435 A | * | 3/1984 | Schule ................. | A01K 5/0291 119/51.13 |
| 4,722,300 A | | 2/1988 | Walker et al. | |

(Continued)

OTHER PUBLICATIONS

AutoFeeder. Product Listing [online]. Wingscapes, 2014 [retrieved on Mar. 11, 2015]. Retrieved from the Internet: http://www.wingscapes.com/wingscapes-autofeeder.

*Primary Examiner* — Richard G Davis
(74) *Attorney, Agent, or Firm* — Cramer Patent & Design, PLLC; Aaron R. Cramer

(57) ABSTRACT

An automatic animal feeding device includes a housing having a frame capable of being suspended. Within the barrel is a removable cartridge having a plurality of feeding tubes. The cartridge is connected to a drive means powered by a solar-powered rechargeable battery. An alignment of a desired one (1) of the plurality of feeding tubes with an aperture in the bottom of the cartridge permits dispensation of contents within the feeding tube. The drive means is also capable of being controlled by an adjustable timing device.

10 Claims, 6 Drawing Sheets

(56) References Cited

U.S. PATENT DOCUMENTS

| | | |
|---|---|---|
| 5,370,080 A | 12/1994 | Koepp |
| 5,549,075 A | 8/1996 | Golden |
| 6,758,163 B1 | 7/2004 | Sternitzky |
| 7,523,717 B2 | 4/2009 | Nicholes |
| 7,650,855 B2 | 1/2010 | Krishnamurthy |
| 8,833,304 B2 | 9/2014 | Whitsett |

* cited by examiner

TIMED GAME FEEDER

RELATED APPLICATIONS

The present invention is a continuation-in-part of, was first described in, and claims the benefit of U.S. Provisional Application No. 62/158,644, filed May 8, 2015, the entire disclosures of which are incorporated herein by reference.

FIELD OF THE INVENTION

The present invention relates generally to the field a stand-alone feeding apparatus capable of being accessed by wild game.

BACKGROUND OF THE INVENTION

Over the years, modern advances in hunting equipment have enhanced the sport, providing hunters with increased success. Precision firearms, high-powered optical scopes, high-tech hunting equipment, and the like, have provided hunters a better chance of landing their trophy game animal. Other devices such as game feeders increase the likelihood of animal activity upon a certain area of land.

Many people enjoy the presence of deer and other wild game in their yards and on their property. In order to attract such animals, many place automated and elevated feeding stations which entice the wildlife to visit, feed and hopefully return on a daily basis. As deer need protein and minerals for antler development, they will seek out a diet rich in these proteins and minerals if available. Deer feeders work best in attracting deer if you use a mixture of various type feed, such as corn, pelletized commercial deer feed deer feed rich in protein, apples, and other types of grain. Of course all of these multiple feeds must somehow be dispensed. Three (3) different feeders can be used, but that becomes cost prohibitive. The food can be premixed beforehand, but that takes time, and may lead to dispensing problems as moisture content between different types of feed may cause clumping. Accordingly, there exists a need for a means by which multiple types of feed can be dispensed by a single wildlife feeder without the disadvantages as described above. The use of the wild game feeder provides hunters an indispensable edge in hunting wild game in a manner that is quick, easy, and effective.

SUMMARY OF THE INVENTION

It is therefore an object of the present invention to provide a wildlife feeder that automatically dispenses a pre-measured amount of food. Such a wildlife feeder can be placed in a remote location, suspended from a tree branch or other support structure, powered through a solar collector, and selectively controlled by a timer. Such a timer can operate through a single cycle. Such a cycle could be in hours, days, or other specific period of time.

In at least one (1) embodiment of the invention, the wildlife feeder includes a support frame, a housing supported by the frame, a prime mover attached to the housing, a cartridge assembly having a plurality of individual cartridge tubes, each capable of receiving an amount of feed therein, removably insertable into the support frame and mechanically connected to the prime mover. A control means, which includes the timer and solar collector, operably controls the prime mover.

Another object of the present invention is to provide such a support frame having a base frame and an upper frame. A pair of first arms, each diametrically opposing each other, span the distance between the base frame and the upper frame. A pair of second arms, each smaller than the first arms, are attached at diametrically opposing locations on the base frame. The pair of first arms and pair of second arms help to support the housing. In at least one (1) embodiment, shims help to affix the housing to each of the pair of first arms and each of the pair of second arms Another object of the invention is to provide a housing that is essentially cylindrical in shape, having a bottom wall. The prime mover is attached to the bottom of the bottom wall. A discharge opening is positioned to be aligned with the plurality of cartridge tubes such that an aligned one (1) of the cartridge tubes is in fluid communication with the discharge opening. A lid is capable of removably attaching to an upper perimeter edge of the housing sidewall.

Another object of the present invention is to provide such a cartridge assembly to include an upper retention plate and a lower retention plate. The plurality of cartridge tubes each are disposed about an array that is capable of being aligned with the discharge opening when the cartridge assembly is placed within the housing. The cartridge tubes are affixed to and span the distance between the upper retention plate and the lower retention plate. A center shaft runs through the center of the assembly, such that the upper end extends through the upper retention plate and is capable of contacting the inner surface of the cover when it is secured to the housing when the cartridge assembly is placed within the housing. The center shaft also has a lower end that is capable of being in mechanical communication with the prime mover when the cartridge assembly is installed within the housing. When installed, the prime mover selectively rotates the cartridge assembly, as controlled by the control means, such that an individual cartridge tube is aligned with the discharge tube, and the contents therein are dispensed. In certain embodiments, insulation can be placed within the interstitial spaces between each of the cartridge tubes. In other embodiments, the number of cartridge tubes is fifteen (15). In other embodiments, a gasket is placed on the upper surface, adjacent the perimeter edge, of the upper retention plate.

Yet another object of the present invention is to provide such a prime mover that includes a drive motor in electrical communication with the control means and attached to a bottom surface of said bottom wall, a first pulley in mechanical communication with the drive motor and attached to a bottom surface of the bottom wall, a belt in mechanical communication with the first pulley, and a second pulley in mechanical communication with the belt and attached to a bottom surface of said bottom wall. The second pulley is capable of being in mechanical communication with the center shaft of the cartridge assembly. Certain embodiments of the invention include a tension spring affixed between the drive motor and support frame.

Yet another object of the present invention is to provide such a control means that also includes, in addition to the solar power collector and timer, a lever pivotally attached to a bottom surface of the bottom wall such that at least a portion thereof extends directly underneath the discharge opening, and a limit switch in electrical communication with the timer control and operably controlled by the lever. The limit switch is activated upon movement of the lever, ostensibly when contacting by contents dispensed from the cartridge assembly, to verify discharge of contents therein to enable the timer control to actuate the drive motor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
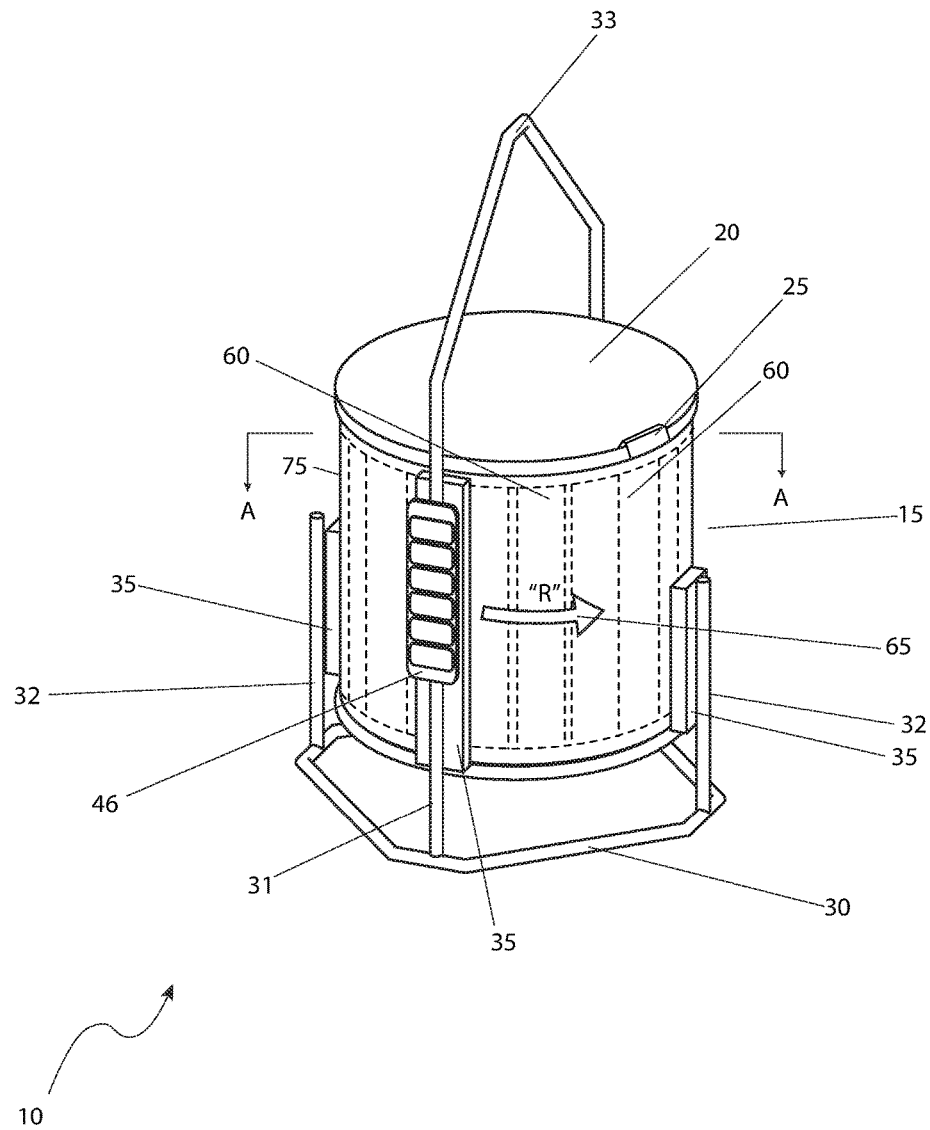
FIG. 1 is an isometric view of the cartridge-style game feeding apparatus 10, according to the preferred embodiment of the present invention.

DESCRIPTIVE KEY 10 cartridge-style game feeding apparatus
15 housing
18 cartridge assembly
20 flat cover
22 bottom wall
25 mechanical latch
30 structural frame
31 long support arm
32 short support arm
33 top triangular frame
35 shim piece
46 solar charging panel
50 lower retention plate
55 upper retention plate
60 cartridge tube
62 insulation
65 rotational path "r"
68 gasket
70 drive motor
75 active discharge tube
80 discharge opening
85 rechargeable battery
95 timer control
100 center shaft
101 drive pulley
102 drive belt
103 output pulley
104 gear box
105 ring array
115 increment angle "a"
121 tension spring
125 feed
135 interconnecting cable
136 limit switch
137 lever

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, an isometric view of the cartridge-style game feeding apparatus 10, according to the preferred embodiment of the present invention is disclosed. The cartridge-style game feeding apparatus 10 (herein referred to generally as an "apparatus 10") is provided with a housing 15 that is cylindrical in shape, having a sidewall and a bottom wall 22. It is envisioned that the housing 15 would be approximately twenty-four inches (24 in.) in diameter and twenty inches (20 in.) tall, however such dimensions or configuration is not intended to be a limiting factor of the present invention. The apparatus 10 is provided with a flat cover 20 which sits atop the housing 15 and is fastened in place by a mechanical latch 25. The cover 20 provides access to fill the interior of the housing 15 when removed and provides environmental protection from dust, dirt, rain and other contaminants when in place. The housing 15 is held in place by a structural frame 30 which holds additional components of the apparatus 10 on its interior while supporting the housing 15 on top. The structural frame 30 provides for two (2) long support arms 31 (of which only one (1) is shown due to illustrative limitations) and two (2) short support arms 32 which hold the components of the apparatus 10 in position. Shim pieces 35, preferably of a wooden construction, can be used to accomplish affixing the housing 15 to the long and short support arms 31, 32. The two (2) long support arms 31 (of which only one (1) is shown due to illustrative limitations) form a top triangular frame 33 to aid in the movement of the apparatus 10. The top triangular frame 33 may also be used to suspend the apparatus 10 from an overhead structure such as a tree limb.

Figure 5:
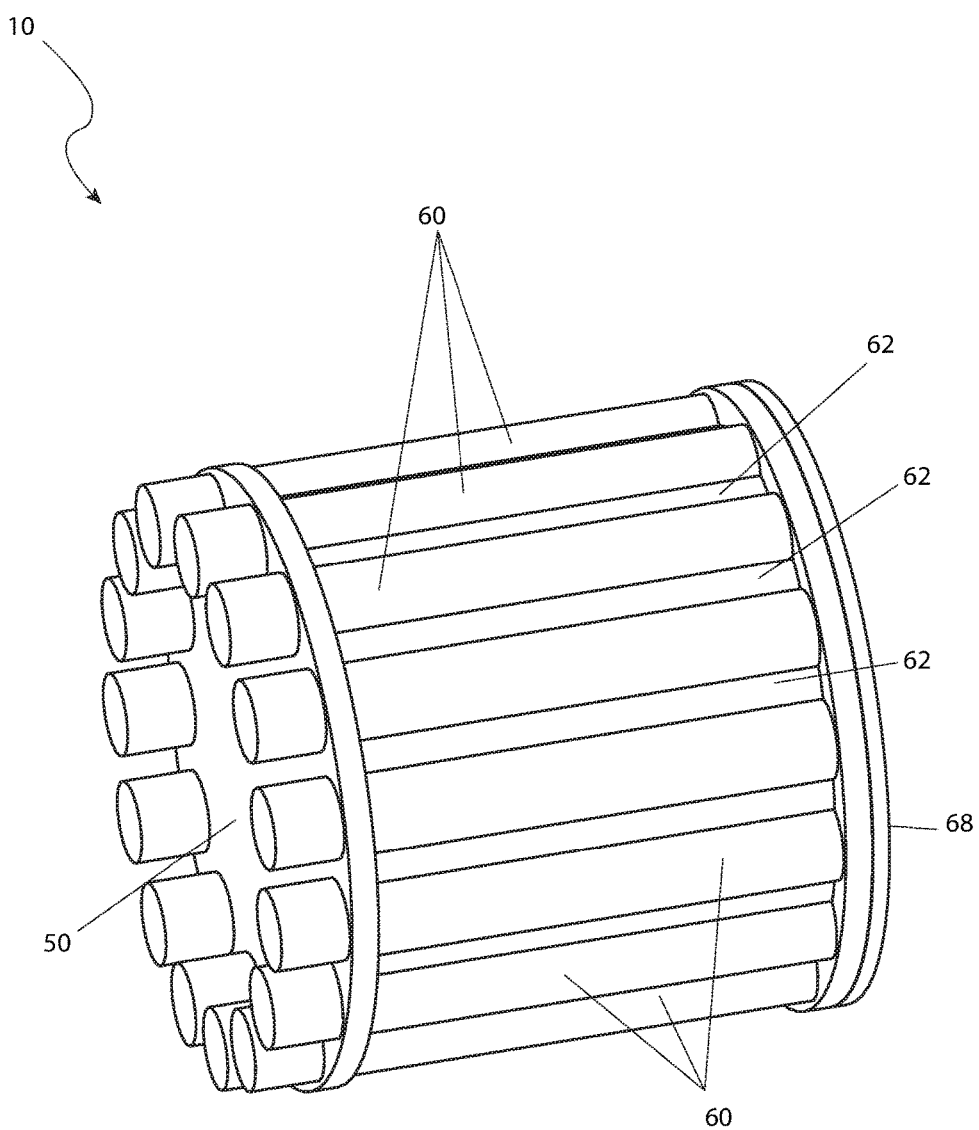
FIG. 5 is a side perspective view of the removable cartridge assembly 18, according to a preferred embodiment of the present invention; and, FIG. 6 is a top perspective view of the removable cartridge assembly 18, according to a preferred embodiment of the present invention.
Figure 6:
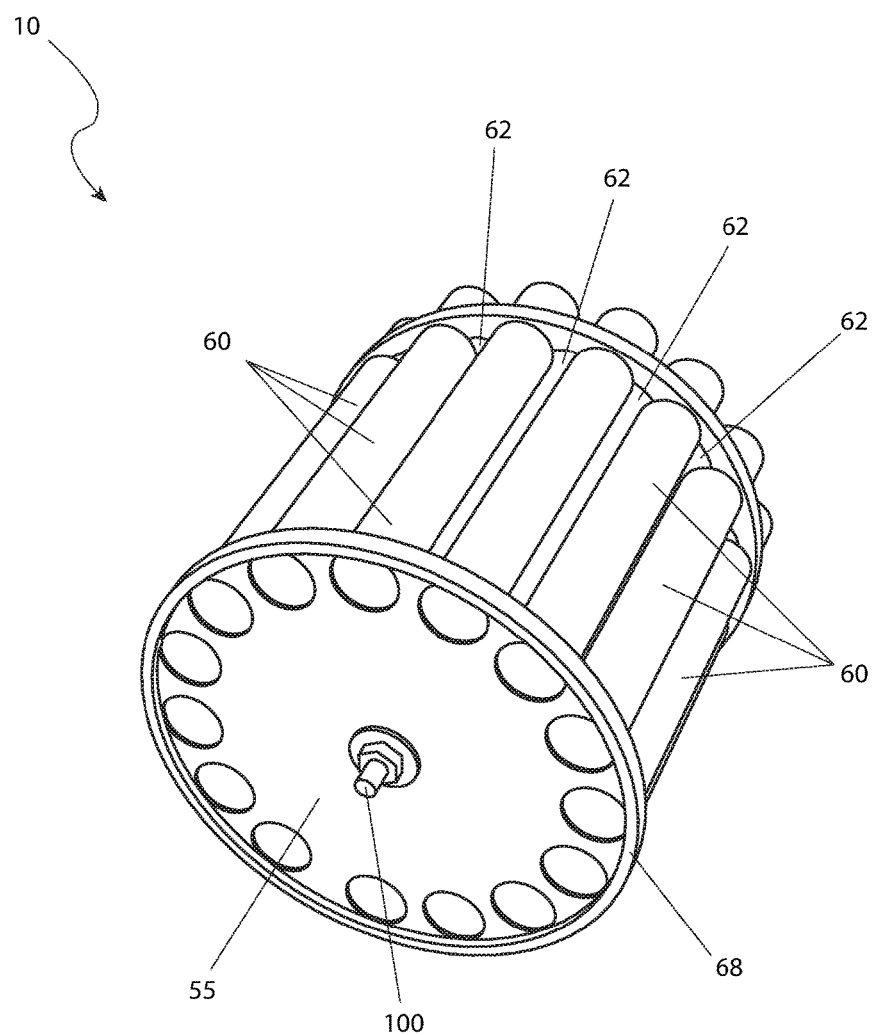

Referring now to FIGS. 5 and 6, perspective views of the cartridge assembly 18, are shown. The cartridge assembly 18 is removably placed within the housing 15. The cartridge assembly 18 includes an upper retention plate 55 with a plurality of apertures, a lower retention plate 50 with a plurality of apertures, and a plurality of cartridge tubes 60 routed therebetween aligned apertures of the upper retention plate 55 and lower retention plate 50. The upper end of the cartridge tubes 60 is flush with the upper outer surface of upper retention plate 55 and the lower edge extends minimally downward from the lower outer surface of the lower retention plate 50. Insulation 62 is provided, acting as a thermal barrier and as an adhesive to maintain spatial clearance between adjacent cartridge tubes 60. A piece of gasket material 68 is placed on an outer perimeter of the upper surface of the upper retention plate 55. The gasket 68 contacts the cover 20 when the cartridge assembly 18 is installed in the housing 15. A center shaft 100 extends through the center, having an upper end extending through the upper retention plate 55 and capable of contacting an interior surface of the cover 20 when the cartridge assembly 18 is installed within the housing 15 and the cover 20 is secured to the housing 15, and a lower end extending through the lower retention plate 50. The location of the center shaft 100 helps provide a center alignment and friction-free rotation of the cartridge assembly 18.

The cartridge tubes 60 each are envisioned to be approximately four inches (4 in.) in diameter, with an approximate quantity of fifteen (15). Said dimension and quantity are an overall function of the physical size of the apparatus 10, and as such, is not intended to be a limiting factor of the present invention. The movable nature of the upper retention plate 55, the lower retention plate 50, and the cartridge tubes 60 rotate along a rotational path "r" 65 within the housing 15. Further functionality of the cartridge tubes 60 will be described in greater detail herein below. Rotation of the upper retention plate 55, the lower retention plate 50, and the cartridge tubes 60 is provided by a drive motor 70 (not visible in this figure due to illustrative limitations) located on the bottom wall 22 of the housing 15. The rotational force provided by the drive motor 70 (not visible in this figure due to illustrative limitations) allows the upper retention plate 55, the lower retention plate 50, and the cartridge tubes 60 to index at an incremental nature such that an active discharge tube 75 aligns with a discharge opening 80 (not visible in this figure due to illustrative limitations). Finally, a solar charging panel 46 is attached to one (1) of the long support arms 31. Further disclosure of the solar charging panel 46 will be provided herein below.

Figure 2:
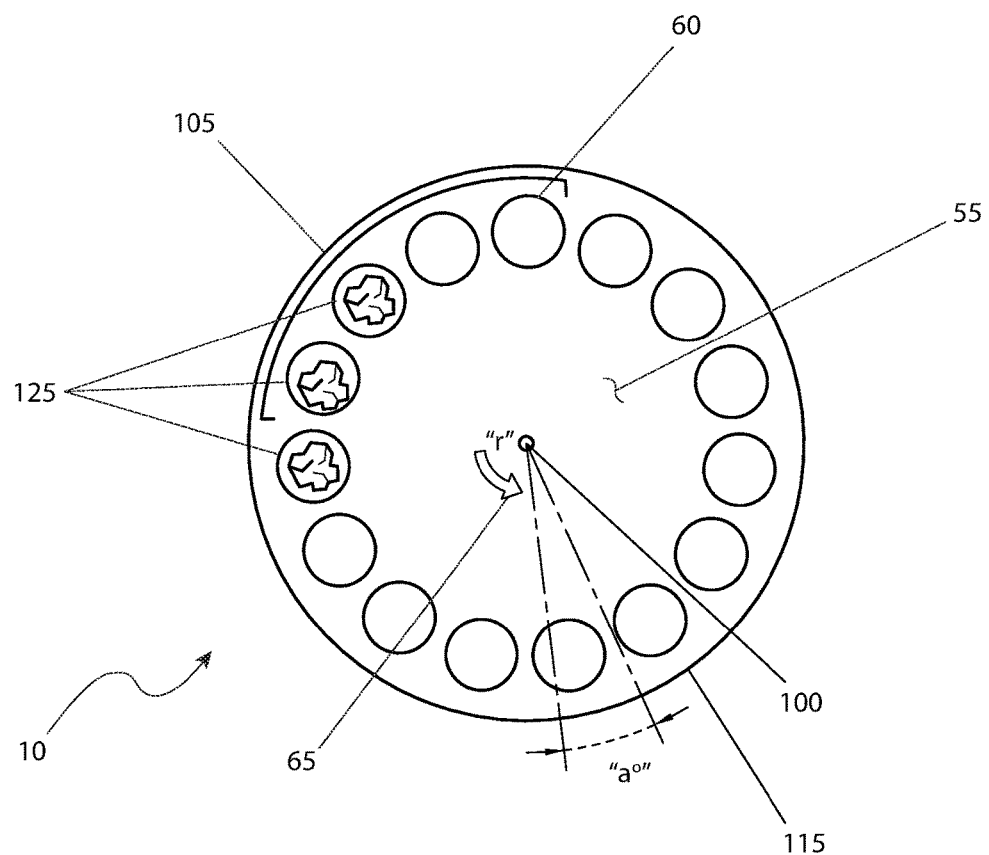
FIG. 2 is a sectional view of the cartridge-style game feeding apparatus 10, as seen along a line A-A as shown in FIG. 1, according to the preferred embodiment of the present invention.

Referring next to FIG. 2, a sectional view of the apparatus 10, as seen along a line A-A as shown in FIG. 1, according to the preferred embodiment of the present invention is depicted. The upper retention plate 55 is visible in this view, which also illustrates the upper end of the center shaft 100. The cartridge tubes 60 are arranged in a ring array 105. The total number of cartridge tubes 60 in the ring array 105 determine an increment angle "a" 115 according to the formula (a=360/n) where n is the number of cartridge tubes 60. This increment angle "a" 115 thusly positions one (1) of the cartridge tubes 60 over the discharge opening 80 (not shown in this figure) whereupon said cartridge tube 60 becomes the active discharge tube 75. This allows feed 125 contained within all of the cartridge tubes 60 to empty out of the bottom due to gravity. At the completion of this said cycle, the next cycle would then position the next cartridge tube 60 over the discharge opening 80 (not shown in this figure). This continues in a cyclical manner until all cartridge tubes 60 are emptied. The cycling process is controlled by a timer control 95 (not shown in this figure). Such control is initially set by the user to allow for rotational advancement at cycles as small as several minutes or as large as several days.

Figure 3:
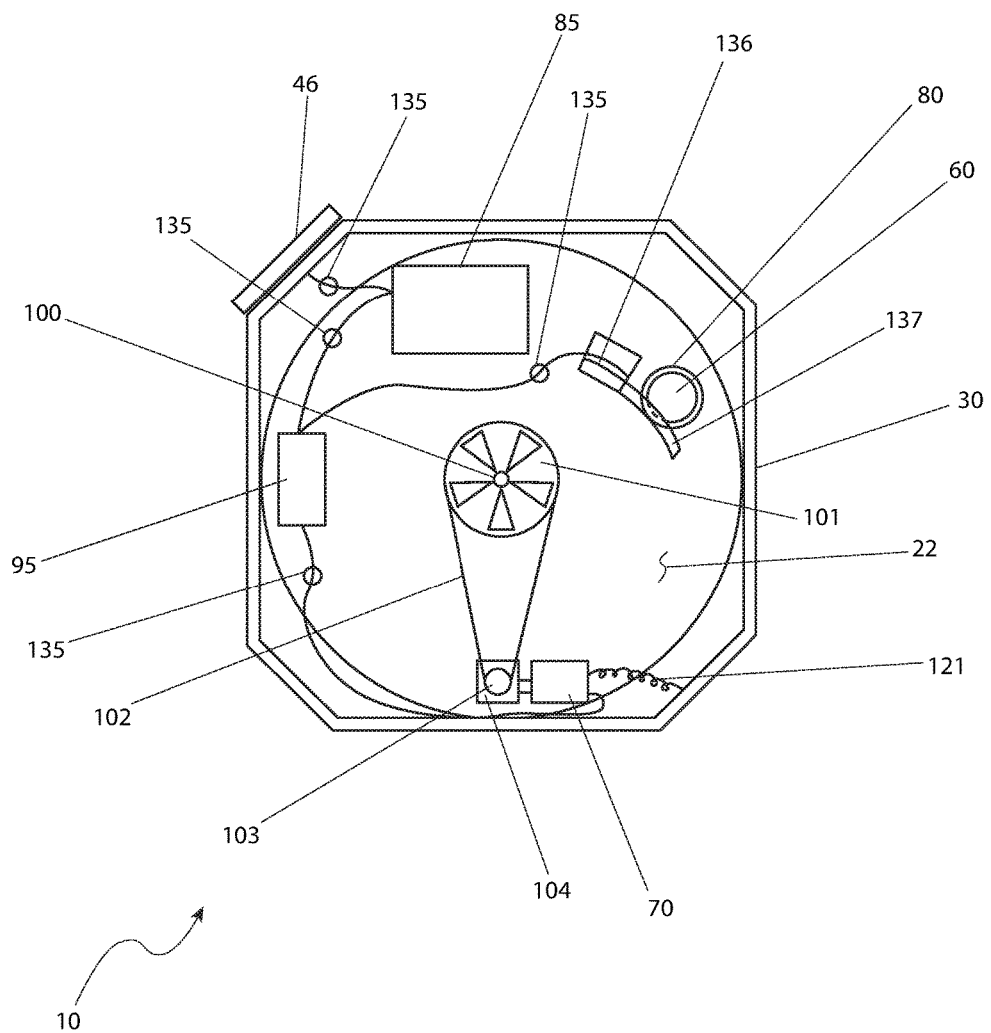
FIG. 3 is a bottom view of the cartridge-style game feeding apparatus 10, according to the preferred embodiment of the present invention.

Referring now to FIG. 3, a bottom view of the apparatus 10, according to the preferred embodiment of the present invention is disclosed. This figure depicts the major electromechanical components of the apparatus 10, which are mounted on the bottom wall 22 and contained within the structural frame 30. The center shaft 100 of the cartridge assembly 18, when installed, is connected to a drive pulley 101 as it is routed through an opening of the bottom wall 22 when installed within the housing 15. The drive pulley 101 works in conjunction with a drive belt 102 connected to an output pulley 103 of a gear box 104 to produce a slow rotational speed along the rotational path "r" 65 (as shown in FIG. 2). The discharge opening 80 is located on the bottom wall 22 and aligned with the ring array 105 of the plurality of cartridge tubes 60. Said rotation thus produces a cartridge tube 60 aligned with the discharge opening 80, thus making it the active discharge tube 75 which allows feed 125 (as shown in FIG. 2) to be released from the apparatus 10.

Said feed 125 then falls to the nearby ground where it is consumed by wild game. The drive motor 70 is held in proper position by a tension spring 121 affixed between it and the structural frame 30. The tension spring 121 ensures proper rotation of the drive pulley 101 regardless of stretching of the drive belt 102. The drive motor 70 is electrically connected to the timer control 95 by use of interconnecting cable 135. Additional sections of interconnect cabling 135 connect the timer control 95 to a rechargeable battery 85 and the timer control 95 to a limit switch 136. A separate interconnect cable 135 connects the rechargeable battery 85 to the solar charging panel 46. All components of the apparatus 10 as shown in FIG. 3 are envisioned to be a waterproof nature and suitable for use in an outdoor environment with temperature extremes. The limit switch 136 is used to verify flow of feed 125 (as shown in FIG. 2) from the discharge opening 80 as associated with movement of a lever 137. The electrical circuit closure and opening provided by the limit switch 136 is used to ensure proper positioning of the cartridge tube 60 over the discharge opening 80 by applying and removing electrical power to the drive motor 70.

Figure 4:
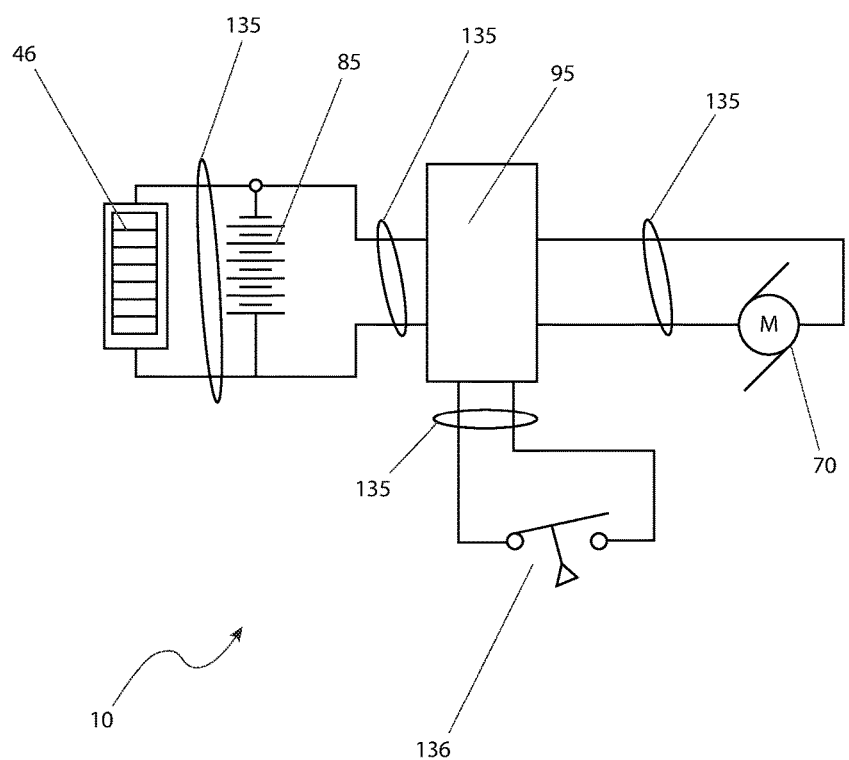
FIG. 4 is an electrical block diagram depicting the major electrical components as used in the cartridge-style game feeding apparatus 10, according to the preferred embodiment of the present invention.

Referring to FIG. 4, an electrical block diagram depicting the major electrical components as used in the apparatus 10, according to the preferred embodiment of the present invention is depicted. As ambient light rays strike the solar charging panel 46, charging current is produced to maintain sufficient voltage in the rechargeable battery 85. Said current and voltage is carried by multiple interconnect cables 135. Resultant electrical power from the rechargeable battery 85 is carried by another interconnect cable 135 to the timer control 95. The timer control 95 has internal settings that may be used by the user to allow for incremental movement of the cartridge tubes 60 (as shown in FIGS. 1, 2, and 3) envisioned to be variable from minutes, hours, or days depending upon the needs of the user and the desire to attract wild game. Additional start and stop signals verifying the presence, start and stop of feed 125 (as shown in FIG. 2) is provided by the limit switch 136 and another section of interconnecting cable 135. Finally, movement of the drive motor 70 is controlled by application of electrical power from the timer control 95 through a final section of interconnect cable 135.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. It is envisioned that the cartridge-style game feeding apparatus 10 would be constructed in general accordance with FIG. 1 through FIG. 6.

After purchase and/or acquisition of the apparatus 10, with the cartridge assembly 18 installed in the housing 15, it is positioned at a suitable outdoor location where desired game or wildlife is expected/likely to gather. Next, the user would remove the flat cover 20 from the housing 15 by the use of the mechanical latch 25. This process exposes the upper end of all cartridge tubes 60 through the vision of the upper retention plate 55. The user would place various types of feed 125, such as corn, pelletized commercial deer feed, apples, other types of grain, and the like into any or all of the cartridge tubes 60. The types of feed 125 placed could be consistent amongst all cartridge tubes 60 or vary from each cartridge tubes 60 to the next cartridge tubes 60 to provide wildlife with greater variety and an increased likelihood of visiting the apparatus 10. Next, the user would verify the presence of voltage at the rechargeable battery 85. Lastly, the user would select a suitable operating cycle time for the apparatus 10 through manipulation of internal controls on the timer control 95. Said cycle time could be anywhere from minutes, to hours to days. At this point in time, the apparatus 10 is ready for operation.

Automatic operation of the apparatus 10 occurs without additional user control in a transparent manner. Upon completion of a timing cycle as determined by the timer control 95 applying electrical power the drive motor 70 to advance the ring array 105 through an increment angle "a" 115. This positions the next cartridge tubes 60 over the discharge opening 80 whereupon feed 125 contained within the active discharge tube 75 will fall out with the aid of gravity. Game or wildlife then consume the feed 125. This process then continues until all cartridge tubes 60 assume the position of the active discharge tube 75 and all feed 125 in the apparatus 10 is depleted. The user would then refill the apparatus 10 as aforementioned described allowing the process to repeat in a cyclical manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A wildlife feeder, comprising:
    a support frame;
    a housing supported on said frame, comprising a side wall and a bottom wall, said bottom wall having a discharge opening;
    a cartridge assembly removably insertable within said housing, comprising:
        an upper retention plate;
        a lower retention plate;
        a center shaft, having an upper end protruding outward from a center of said upper retention plate, and a lower end protruding outward from a center of said lower retention plate; and,
        a plurality of cartridge tubes, each spanning a distance between said upper retention plate and said lower retention plate, said plurality of cartridge tubes disposed within an array capable of being aligned with said discharge opening;
    a cover removably securable to an upper perimeter of said housing;
    shim pieces interconnecting said housing sidewall to said pair of first arms and said pair of second arms;
    a prime mover capable of mechanical communication with said center shaft and operably controlling said cartridge assembly when said cartridge assembly in installed within said housing, said prime mover attached to said bottom wall; and,
    a control means in electrical communication with said prime mover for selectively operating said prime mover, said control means attached to said bottom wall;
    wherein each of said plurality of cartridge tubes are capable of receiving an amount of contents therein;
    wherein said control means controls said prime mover to selectively align an individual cartridge tube with said discharge opening to dispense said contents;
    wherein said support frame further comprises:
        a base frame member;
        a pair of first arms, each having a proximal end vertically extending from diametrically opposing first locations on said base frame member;
        a pair of second arms, each having a proximal end vertically extending from diametrically opposing second locations on said base frame member, each of said pair second arms are shorter than said pair of first arms; and,
        an upper frame member attached to both distal ends of said pair of first arms;
        wherein said housing sidewall is supported by said pair of first arms and said pair of second arms;
    wherein said cartridge assembly further comprises a gasket affixed to an upper surface, adjacent a perimeter edge, of said upper retention plate; and,
    wherein shim pieces interconnect said housing sidewall to said pair of first arms and said pair of second arms.

2. The feeder of claim 1, wherein said prime mover further comprises:
    a drive motor in electrical communication with said control means and attached to a bottom surface of said bottom wall;
    a first pulley in mechanical communication with said drive motor and attached to a bottom surface of said bottom wall;
    a belt in mechanical communication with said first pulley; and,
    a second pulley in mechanical communication with said belt and attached to a bottom surface of said bottom wall, said second pulley capable of being in mechanical communication with said center shaft of said cartridge assembly;
    wherein actuation of said drive motor by said control means selectively indexes said cartridge assembly in a rotational path to align said individual cartridge tube with said discharge opening.

3. The feeder of claim 2, further comprising a tension spring affixed between said drive motor and said support frame.

4. The feeder of claim 2, wherein said control means further comprises:
    a solar power collector attached to said support frame;
    a power source attached to said bottom wall and in electrical communication with said solar power collector;
    a selectable timer control in electrical communication with said power source;
    a lever pivotally attached to a bottom surface of said bottom wall such that at least a portion thereof extends directly underneath said discharge opening; and,
    a limit switch in electrical communication with said timer control and operably controlled by said lever;
    wherein said timer control operably actuates said drive motor to subsequently index said cartridge assembly such that subsequent cartridge tubes are each aligned with said discharge opening; and, wherein said limit switch is activated upon movement of said lever to verify discharge of contents therein to enable said timer control to actuate said drive motor.

5. The feeder of claim 4, wherein said timer control operably actuates said drive motor through a single cycle.

6. A wildlife feeder, comprising:
a support frame;
a housing supported on said frame, comprising a side wall and a bottom wall, said bottom wall having a discharge opening;
a cartridge assembly removably insertable within said housing, comprising:
an upper retention plate;
a lower retention plate;
a center shaft, having an upper end protruding outward from a center of said upper retention plate, and a lower end protruding outward from a center of said lower retention plate;
a plurality of cartridge tubes, each spanning a distance between said upper retention plate and said lower retention plate, said plurality of cartridge tubes disposed within an array capable of being aligned with said discharge opening; and,
insulation disposed within an interstitial space between each of said plurality of cartridge tubes;
a cover removably securable to an upper perimeter of said housing;
a prime mover capable of mechanical communication with said center shaft and operably controlling said cartridge assembly when said cartridge assembly in installed within said housing, said prime mover attached to said bottom wall; and,
a control means in electrical communication with said prime mover for selectively operating said prime mover, said control means attached to said bottom wall;
wherein each of said plurality of cartridge tubes are capable of receiving an amount of contents therein;
wherein said control means controls said prime mover to selectively align an individual cartridge tube with said discharge opening to dispense said contents;
wherein said support frame further comprises:
a base frame member;
a pair of first arms, each having a proximal end vertically extending from diametrically opposing first locations on said base frame member;
a pair of second arms, each having a proximal end vertically extending from diametrically opposing second locations on said base frame member, each of said pair second arms are shorter than said pair of first arms; and,
an upper frame member attached to both distal ends of said pair of first arms;

wherein said housing sidewall is supported by said pair of first arms and said pair of second arms;
wherein said cartridge assembly further comprises a gasket affixed to an upper surface, adjacent a perimeter edge, of said upper retention plate; and,
wherein shim pieces interconnect said housing sidewall to said pair of first arms and said pair of second arms.

7. The feeder of claim 6, wherein said prime mover further comprises:
a drive motor in electrical communication with said control means and attached to a bottom surface of said bottom wall;
a first pulley in mechanical communication with said drive motor and attached to a bottom surface of said bottom wall;
a belt in mechanical communication with said first pulley; and,
a second pulley in mechanical communication with said belt and attached to a bottom surface of said bottom wall, said second pulley capable of being in mechanical communication with said center shaft of said cartridge assembly;
wherein actuation of said drive motor by said control means selectively indexes said cartridge assembly in a rotational path to align said individual cartridge tube with said discharge opening.

8. The feeder of claim 7, further comprising a tension spring affixed between said drive motor and said support frame.

9. The feeder of claim 7, wherein said control means further comprises:
a solar power collector attached to said support frame;
a power source attached to said bottom wall and in electrical communication with said solar power collector;
a selectable timer control in electrical communication with said power source;
a lever pivotally attached to a bottom surface of said bottom wall such that at least a portion thereof extends directly underneath said discharge opening; and,
a limit switch in electrical communication with said timer control and operably controlled by said lever;
wherein said timer control operably actuates said drive motor to subsequently index said cartridge assembly such that subsequent cartridge tubes are each aligned with said discharge opening; and,
wherein said limit switch is activated upon movement of said lever to verify discharge of contents therein to enable said timer control to actuate said drive motor.

10. The feeder of claim 9, wherein said timer control operably actuates said drive motor through a single cycle.

* * * * *